March 18, 1930. R. D. MARX 1,750,677
TRUCK
Filed Aug. 3, 1928
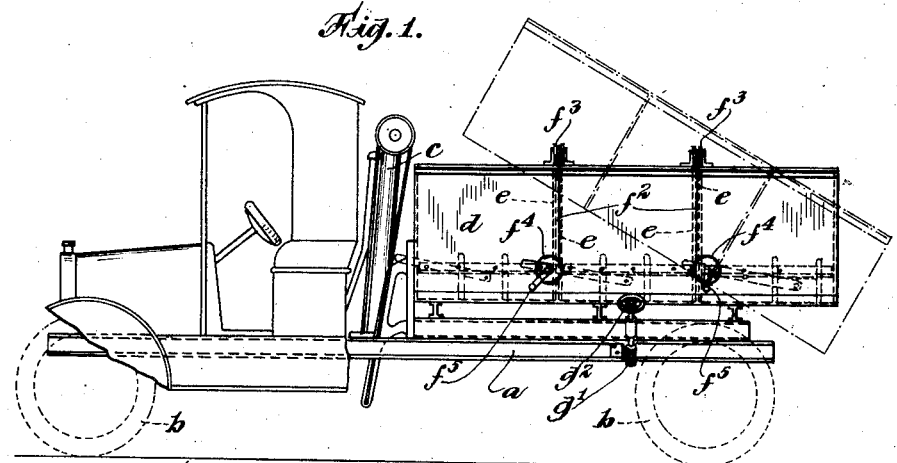
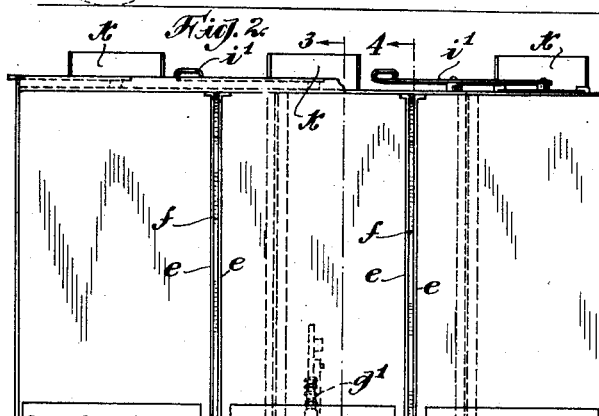
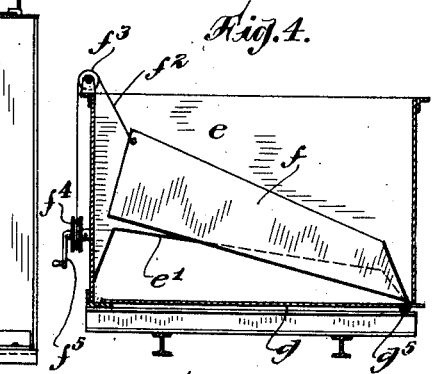
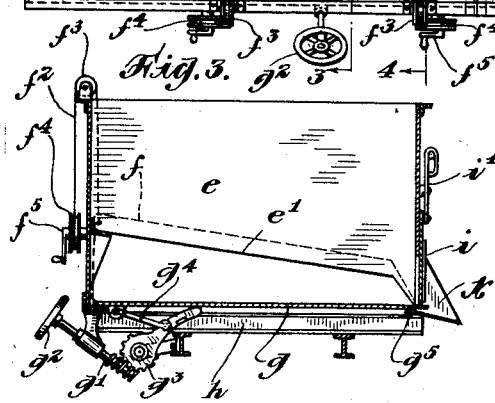
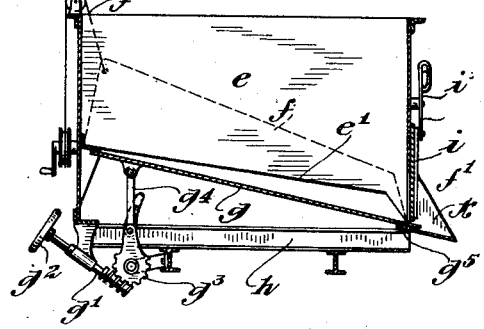
Inventor
Robert D. Marx
By his Attorneys
Redding, Greeley, O'Shea & Campbell Patented Mar. 18, 1930

1,750,677

UNITED STATES PATENT OFFICE

ROBERT D. MARX, OF BROOKLYN, NEW YORK

TRUCK

Application filed August 3, 1928. Serial No. 297,358.

The retail coal dealer is sometimes required to deliver coal to a customer in such quantities as to fill the body of a truck arranged to discharge from the rear, and sometimes is required to deliver coal in a quantity less than the capacity of the body, in which case the needs of several small customers can be supplied conveniently from a body provided with means for discharge at the side. The large retail dealer, operating a fleet of delivery trucks, finds it economical to have trucks of both kinds, but the small dealer sometimes finds that the cost of trucks of both kinds imposes a too heavy financial burden on his business. It is the object of the present invention to meet the needs of the relatively small dealer by providing a truck body which can be used for both of the purposes referred to.

In accordance with the invention the body has partitions which form compartments adapted to receive, each, a small quantity of coal, provisions being made whereby the contents of each compartment can be discharged at the side of the body. The partitions have movable members which can be raised above the floor of the body so that the entire contents of the body can be discharged at the rear end.

The invention will be more fully explained hereinafter with reference to the accompanying drawings in which it is illustrated and in which:

Figure 1 is a view in side elevation, partly in outline, of a truck which embodies the invention.

Figure 2 is a view on a somewhat larger scale of the body as seen from above.

Figure 3 is a view in section on the plane indicated by the broken line 3—3 of Figure 2.

Figure 4 is a view in section on the plane indicated by the broken line 4—4 of Figure 2 but with the movable partitions swung up.

Figure 5 is a view similar to Figure 3, but showing the floor of the body tilted for side delivery.

Figure 1 of the drawings shows so much of an ordinary form of truck as is necessary to enable the application of the invention to be understood, the invention not being concerned with the general features of construction of the truck. The truck represented in Figure 1 has an ordinary chassis or supporting framework $a$, mounted on wheels $b$ and provided with an ordinary form of lift $c$ for the purpose of tilting the body $d$ upon the chassis to discharge the load at the rear end, which may be provided with a gate not necessary to be shown or described herein.

The body $d$ is divided into compartments by transverse partitions. For example, only two of such partitions are shown, but it will be understood that a greater number of partitions may be provided. Each of such partitions, in the embodiment of the invention illustrated, comprises a fixed member or portion $e$ and a relatively movable member or portion $f$. Preferably, and for convenience, the fixed portion $e$ is double and the relatively movable portion $f$ is arranged for vertical movement between the two parts $e$, $e$ of the fixed portion. The fixed portion $e$ does not extend all the way of the floor of the body, but is cut away at its lower edge, as indicated at $e^1$, so as to leave an opening between it and the floor. The relatively movable portion $f$, may rest upon the floor, as shown in Figure 3, or it may be raised, as indicated in Figure 4. In the construction illustrated, the movable portion $f$ is represented as arranged to swing upward from a point at the delivery side of the truck. Any convenient means may be provided for raising the partition member $f$, such, for example, as a cable $f^2$ connected to the movable member $f$ between the partition walls $e$, $e$, passing over a guide pulley $f^3$ and connected to a drum $f^4$, suitably supported on the side of the body and provided with a crank $f^5$ for operation.

The floor $g$ of the body is arranged to be tilted to the side, as represented in Figure 5. Any convenient means may be provided for thus tilting the floor. As shown a worm shaft $g^1$, provided with an operating handwheel $g^2$ engages a worm gear $g^3$ which is connected by a link $g^4$ with the floor $g$ at one side thereof. In this construction the floor swings upon a hinge line, as at $g^5$, and in a horizontal position rests directly upon the body frame $h$ at each side thereof. For each compartment formed by the transverse partitions there is provided a discharge gate $i$, operated by any convenient means such as a lever $i^1$, and a discharge chute $k$.

When the truck is to be sent out with a load sufficient to fill the entire body the movable partitions $f$ are raised, as shown in Figure 4, before the truck is loaded, providing a clear way for the discharge of the entire load at the rear end of the body when the body is tilted, as represented by broken lines in Figure 1. In the discharge of the load, under these conditions, the coal runs through the unobstructed openings left below the fixed partitions by the raising of the movable members thereof. If, however, the truck is to be sent out with several small quantities of coal to be delivered, perhaps to different customers, the floor $g$ is tilted, as shown in Figure 5, before the truck is loaded, the movable members of the partitions riding up with the floor as it is tilted. The contents of each compartment can then be discharged at the side of the truck in the usual manner.

It will be understood that details of construction can be varied to suit the convenience of the manufacturer, or of the user, and that the invention, except as pointed out in the accompanying claims, is not restricted to the particular construction shown and described herein.

I claim as my invention:

1. The combination in a truck of a supporting frame, a truck body tiltable to the rear, means to tilt the body to the rear, a floor for the body tiltable to the side independently of the body, a transverse partition comprising a relatively fixed portion spaced at its lower edge from the floor and a relatively movable portion adapted to rest normally on the floor, said partition forming compartments in the body, and means to raise the movable portion from the floor.

2. The combination in a truck of a supporting frame, a truck body tiltable to the rear, means to tilt the body to the rear, a floor for the body tiltable to the side independently of the body, a transverse partition comprising a relatively fixed portion spaced at its lower edge from the floor and a relatively movable portion adapted to rest normally on the floor, said partition forming compartments in the body, means to raise the movable portion from the floor, and means to tilt the floor to cause it to engage the lower edge of the movable portion of the transverse partition when in its raised position.

This specification signed this 2d day of Aug., A. D. 1928.

ROBERT D. MARX.